Aug. 25, 1964     W. L. LECHNER     3,145,922
CALCULATING MACHINE REGISTER
Filed Jan. 23, 1962
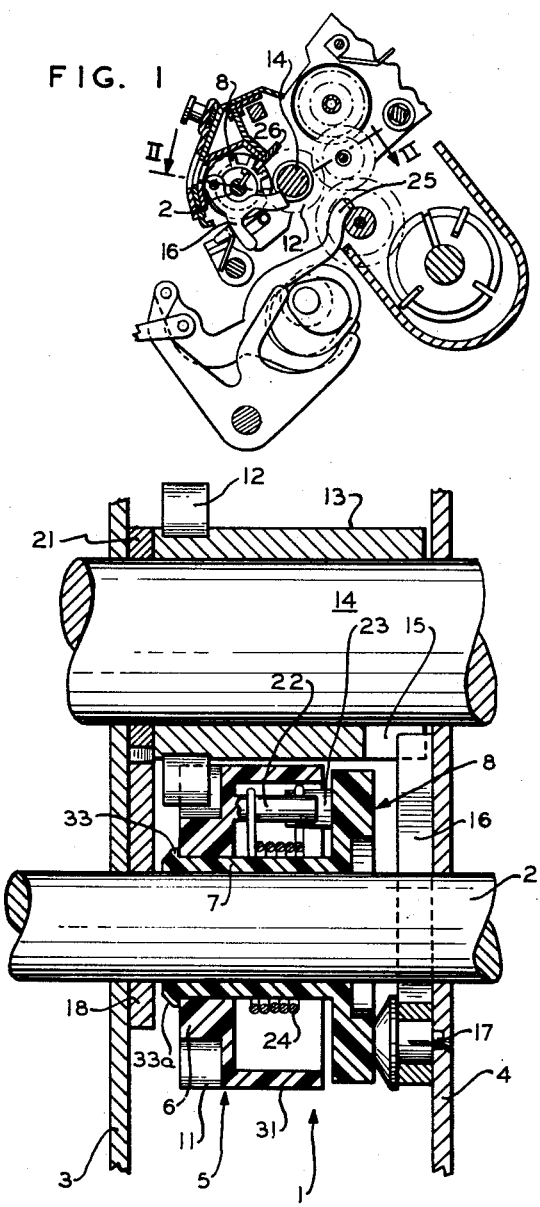
INVENTOR.
WALTER L. LECHNER
BY
N. Friedman
ATTORNEY United States Patent Office 3,145,922
Patented Aug. 25, 1964

3,145,922
CALCULATING MACHINE REGISTER
Walter L. Lechner, New Providence, N.J., assignor to Monroe Calculating Machine Company, Orange, N.J., a corporation of Delaware
Filed Jan. 23, 1962, Ser. No. 168,218
2 Claims. (Cl. 235—1)

This invention relates to improvements in calculating machine registers.

More particularly it pertains to an improved numeral wheel register unit construction.

One well-known type of register wheel unit comprises a numeral wheel element rotatably journaled on an axle-like member, the axle-like member in turn being rotatably supported on a shaft. A register unit of this type is disclosed in U.S. Patents No. 2,531,205 and No. 2,980,324. Prior art designs of such units have involved a multiplicity of parts, thereby increasing manufacturing costs.

It is a primary object of the present invention to provide an improved version of the above-mentioned register wheel unit.

It is a further object to provide such a unit which, while performing all the intended functions of the corresponding prior art devices, requires a fewer number of parts and is simpler and more economical to manufacture.

It is a further object to provide a simpler and less expensive register wheel unit of this general type with improved operating characteristics.

As described in detail hereinafter, in a preferred embodiment, the principles of the invention are incorporated in a register unit which comprises a numeral wheel member having a hub opening by which the wheel is rotatably journaled on a tubular axle member. The axle member includes a beveled flange or lip whose largest diameter is greater than the diameter of the hub opening. Because of its bevel, the flange tapers to a smaller diameter equal to or slightly less than the hub opening diameter. The tubular axle is recessed by the provision of longitudinal slots therein to make it more easily compressible. To assemble the numeral wheel on the axle the flanged portion of the latter is merely pushed through the hub opening, the beveled flange edge causing a camming action whereby the latter is compressed rotatably inward to allow it to pass through the hub opening. The axle is recessed by the provision of longitudinally extending slots therein to render it more readily compressible for this operation. After the flanged portion of the axle has been pushed completely through the hub opening, the inherent resiliency of the axle causes it to spring back outwardly to its normal configuration.

The above and other objects, advantages and features of the invention will be more readily apparent from the following detailed description when read in connection with the accompanying drawing in which:

FIG. 1 is a fragmentary right side elevational view, in section, of a calculating machine in which the novel register wheel unit of the invention is embodied.

FIG. 2 is a sectional view taken on line II—II of FIG. 1.

FIG. 3 is a perspective view of the integral constant factor gear and axle of the register wheel unit.

FIG. 4 is a fragmentary view, partially in section, showing the radial compression of the axle as it is being assembled to the numeral wheel hub.

The novel register wheel unit of the invention finds its primary application as a basic ordinal unit of a multiplier storage register of the constant factor type. Such a constant factor multiplier storage register and ancillary control mechanism whereby values stored in the register are counted therefrom to control a multiplication program are disclosed in U.S. Patents No. 2,531,205 granted November 21, 1950, to Herman Gang, and No. 2,980,324 granted April 18, 1961, to Fritz A. Deutsch et al. It will be appreciated, however, that the principles of the invention are readily applicable to other types of registers and computing machines.

A specific embodiment of the invention incorporated in the calculating machines disclosed in the aforesaid Gang and Deutsch patents will now be described. Reference is hereby made to said patents for a detailed description of prior art structure and operation thereof not included herein.

Each ordinal register wheel unit 1 of the ordinally arranged multiplier storage register is mounted on and rotatably supported by a transversely extending shaft 2 between two adjacent framing plates 3 and 4. Register unit 1 includes a numeral wheel element 5 having a hub portion 6 journaled for rotation on a leftwardly extending tubular axle 7 rigid with a constant factor gear 8. Axle 7 in turn is rotatably journaled on shaft 2, either directly as best seen in FIG. 2 of the present drawing; or through the intermediary of a sleeve as shown in FIG. 4 of Gang Patent No. 2,531,205.

A pinion gear 11 rigid with numeral wheel 5 meshes with a multiplier storage gear 12 integral with the left-hand end of a sleeve 13 rotatably journaled on a second shaft 14. The right-hand end of sleeve 13 includes a recess in the form of a notch 15. A sensing finger 16 pivotally mounted on a headed pin 17 rides on the outside cylindrical surface of the right-hand end of sleeve 13. Pin 17 is one of three identical equiangularly spaced pins secured to framing plate 4 and adapted to space the gear 8 from said plate, the other two pins not being shown. A pawl 18 pivoted on shaft 2 has a laterally extending lug (not shown) engageable with the teeth of storage gear 12 to detent the latter in its various digital positions. A cam 21 is secured as by splining to shaft 14 whereby rotation of said shaft will rock the cam and thereby swing pawl 18 out of detenting relation with storage gear 12.

Wheel 5 and gear 8 rotate conjointly as a unit in nonconstant factor operation. Each of said elements includes an inwardly extending pin 22, 23 respectively. The respective free ends of a helical torsion spring 24 are hooked over the pins, biasing the latter into abutment with each other.

As described in the Gang and Deutsch patents, multiplication is carried out as follows. In nonconstant factor operation, gear 8 and numeral wheel 5 stand at their normal, zero position. To enter a multiplier, gear 8 is differentially rotated, by suitable means as described in the aforesaid patents, to cause it, and numeral wheel 5, and the multiplier storage gear 12 to assume their respective angular positions representative of the multiplier value. Upon initiation of the multiplication program, a cyclically operated counting finger 25 is effective to count the storage gear 12 back to zero by successively stepping it backward a value of 1 in each machine cycle. When the entire multiplier value in the current order has been counted down to zero, notch 15 of sleeve 13 will have moved into alignment with the rearward, effective end of sensing finger 16, allowing the latter to enter the notch. This movement of finger 16 is effective to initiate operation of certain control mechanisms, whose details are not necessary for an understanding of the present invention, which will suspend operation of the counting finger, cause a one-order shift of the multiplier storage register to bring the storage gear 12 holding the next multiplier digit into cooperable relation with the counting finger 25, and then reinitiate the multiplier count-out operation of the finger.

In constant factor operation, gear 8 is held at the multiplier value while storage gear 12 and numeral wheel 5 are being counted back to zero by finger 25. A locking comb 26 (FIG. 1) performs the function of holding the various ordinal ones of gears 8 at their original digitally adjusted positions while the multiplier is being counted out of gears 12 and wheels 5. It will therefore be seen that after reduction of the multiplier value to zero in any given order, gear 8 will still be standing at the original multiplier value therein, while the numeral wheel 5 will be at zero position. Pins 22 and 23 will accordingly have been moved apart a corresponding angular distance, in opposition to the bias of torsion spring 24.

After completion of the multiplication calculation, shaft 14 is rocked causing cam 21 to swing detenting pawl 18 to ineffective position relative to storage gear 12. This allows torsion spring 24 to rotate numeral wheel member 5 on axle 7 from the wheel's zero position to the constant factor value setting at which gear 8 has been held by locking comb 26, the abutting of pins 22 and 23 determining the final position of the numeral wheel member.

The novel register wheel unit 1 of the invention is constructed as follows. The numeral wheel member 5 of unit 1 comprises an annular thin-walled cylindrical shell 31 on whose exterior surface the representations of the digits 0 through 9 inclusive may be applied in any suitable fashion. The integral hub portion 6 includes an axial circular opening 32 for receiving axle 7 of gear 8. Pinion 11 is integral with wheel 5. Pin 22 is also integral with wheel 5 and extends to the right within the wheel shell 31.

The constant factor gear 8 is formed integrally with the leftwardly extending axle member 7. Axle 7, as described before, rotatably supports the wheel member 5. The axle is a sleeve-like, hollow, thin-walled member which is journaled for rotation on shaft 2. At its leftward free end, axle 7 includes an integral external circumferentially extending flange or lip 33. As seen in FIG. 2, the shoulder defined by the right-hand edge of flange or lip 33 serves as a means for limiting leftward movement of the wheel element 5 on axle 7. To facilitate mounting wheel 5 on the axle, the latter is formed with weakening means, described below, to allow it to be conveniently compressed in a radially inward direction. In this regard, it should be noted that in the assembled condition of the register unit as shown in FIG. 2, a portion of the axle at flange 33 is of a larger diameter than the diameter of the hub opening 32. The outside diameter of the axle portion disposed within the hub opening is, of course, slightly smaller than the diameter of the latter so as to provide for free rotation of the wheel on the axle.

As manufactured, and prior to mounting the wheel element 5 thereon, the flanged left-hand portion of axle 7 is larger in diameter than the hub opening 32. That is to say, prior to assembly of these parts they have the same diametral relation as after assembly, as described in the preceding paragraph. To facilitate assembly, flange 33 is formed with beveled cam edge 33a which tapers toward the axle's free end. In other words, at the flange portion, the outside diameter of the axle (including the flange) increases from a given value at the extreme left-hand end of the axle to a larger maximum dimension at the right-hand end of bevel edge 33a. The outside diameter at the extreme left end of the axle is normally equal to or slightly less than the diameter of the hub opening 32; while the maximum diameter at the right end of bevel edge 33a is somewhat larger than the hub opening. When axle 7 is assembled to hub portion 6, the inside wall of the hub opening will engage edge 33a. Because of the above-described dimensional relation between these parts, the inside wall of the hub opening 6 will engage with the cam edge resulting in a radially inward force component being applied to the axle through flange 33. This will compress the left-hand portion of the axle sufficiently to allow it to pass through the hub opening.

The axle includes weakened areas to render it more readily compressible for passage of flange 33 through the hub opening. Such weakened areas are preferably provided in the form of a pair of diametrically opposed longitudinal slots 34, 35 in the axle. Said slots extend from the left or free end of the axle through the flange to a point intermediate the flange and the constant factor gear 8.

To assemble the register unit 1 all that need be done is place spring 24 around the axle, and then press the latter through the hub opening 32 of wheel element 5. As seen in FIG. 4, when the left end of the axle is pressed against the right-hand side of hub 6, the engagement of the wall of opening 32 with the beveled cam edge 33a of flange 33 will compress the tubular axle radially inwardly to a smaller dimension sufficient to allow it to pass through the opening 32, this inward compression being facilitated by slots 34 and 35. As soon as the entire flange has passed through the hub opening, the inherent resiliency of the thin-walled sleeve will cause the axle to snap back to its normal configuration as seen in FIGS. 2 and 3.

Preferably, both the wheel element and axle gear element 7-8 are made of synthetic, resinous materials such as nylon, which lend themselves to fabrication of these parts by molding techniques, and which also provide the tubular axle 7 with the desired characteristic of resilient compressibility. The provision of weakened portions, such as slots 34, 35, in the axle 7 has the further advantage that the outside diameter of the axle where it rotatably supports hub 6 is in a sense "self adjusting" to the diameter of the hub opening. If the axle is slightly oversize, after assembly it will nevertheless by sufficiently yieldable to allow rotation of the wheels, particularly where the parts are made of relatively low frictional coefficient materials, such as nylon or the like.

While there has been shown and described herein a preferred embodiment, it will be understood that numerous changes can be made in details, form, shape, arrangement, etc., thereof without departing from the scope and spirit of the invention. Accordingly, it is intended that the foregoing disclosure of a specific embodiment shall be illustrative only and not limiting of the following claims.

I claim:

1. In a computing device having a register comprising an ordinally arranged series of register units, the improvement wherein at least one of said register units comprises:

a register wheel member having a hub portion including a hub opening extending completely through said hub portion;

a second member including a tubular axle adapted to extend through said hub opening to rotatably support said wheel member;

a limited portion of said axle having normally a larger transverse maximum dimension than the minimum transverse dimension of said hub opening;

said limited axle portion being resiliently compressible to a smaller maximum dimension to provide for passage thereof through said hub opening;

means for compressing said limited axle portion to said smaller maximum dimension; and shaft means extending through and upon which said tubular axle is rotatably mounted.

2. In a computing device having a register comprising an ordinally arranged series of register units, the improvement wherein at least one of said register units comprises:

a register wheel member having a hub portion including a hub opening extending completely through said hub portion;

a second member including a cylindrical thin-walled tubular axle adapted to extend through said hub opening and rotatably support said wheel member;
said axle being provided with two diametrically opposed longitudinally extending slots;
said slots opening at one end thereof through an end of said axle and being closed at their opposite end;
said axle including an annular external flange integral therewith at said end of said axle;
said flange including a portion annularly tapered toward said end of said axle;
the smallest diameter of said tapered portion of said flange being not larger than the diameter of said hub opening; and
shaft means extending through and upon which said tubular axle is rotatably mounted.

References Cited in the file of this patent

UNITED STATES PATENTS

| | | |
|---|---|---|
| 1,915,249 | Jorgensen | June 20, 1933 |
| 2,279,337 | Niemann | Apr. 14, 1942 |
| 2,529,420 | Ramquist | Nov. 7, 1950 |
| 2,558,589 | Skolfield | June 26, 1951 |
| 2,702,087 | Beier | Feb. 15, 1955 |
| 2,884,283 | Koral et al. | Apr. 28, 1959 |
| 2,912,712 | Shamban et al. | Nov. 17, 1959 |
| 2,974,984 | Koch | Mar. 14, 1961 |
| 3,004,238 | Damon | Oct. 10, 1961 |
| 3,112,547 | Poe | Dec. 13, 1963 |

FOREIGN PATENTS

| | | |
|---|---|---|
| 845,152 | Great Britain | Aug. 17, 1960 |